United States Patent
Si et al.

(10) Patent No.: US 12,295,029 B2
(45) Date of Patent: May 6, 2025

(54) METHOD AND APPARATUS FOR CHANNEL OCCUPANCY SHARING WITH SIDELINK

(71) Applicant: Samsung Electronics Co., Ltd., Suwon-si (KR)

(72) Inventors: Hongbo Si, Plano, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 17/813,859

(22) Filed: Jul. 20, 2022

(65) Prior Publication Data

US 2023/0045566 A1  Feb. 9, 2023

Related U.S. Application Data

(60) Provisional application No. 63/227,858, filed on Jul. 30, 2021.

(51) Int. Cl.
  *H04W 74/02* (2009.01)
  *H04W 72/04* (2023.01)
  (Continued)

(52) U.S. Cl.
  CPC ........... *H04W 74/02* (2013.01); *H04W 72/04* (2013.01); *H04W 72/12* (2013.01); *H04W 74/08* (2013.01)

(58) Field of Classification Search
  CPC ........ H04L 5/00; H04W 16/14; H04W 52/00; H04W 72/04; H04W 72/12; H04W 74/00; H04W 74/02; H04W 74/08
  See application file for complete search history.

(56) References Cited

U.S. PATENT DOCUMENTS

2020/0359411 A1  11/2020  Li et al.
2021/0092783 A1  3/2021  Sun et al.
(Continued)

FOREIGN PATENT DOCUMENTS

EP  3820068 A1  5/2021
WO  2020091566 A1  5/2020
(Continued)

OTHER PUBLICATIONS

International Search Report and Written Opinion issued Nov. 14, 2022 regarding International Application No. PCT/KR2022/011226, 6 pages.
(Continued)

*Primary Examiner* — Alpus Hsu

(57) ABSTRACT

Methods and apparatuses for channel occupancy sharing with a sidelink in a wireless communication system. A method of a user equipment (UE) includes receiving, from a base station (BS), a set of configurations, determining a channel occupancy initiated by the BS based on the set of configurations, determining a set of resources for a first sidelink transmission within the channel occupancy based on the set of configurations, and determining a sidelink channel access procedure associated with the first sidelink transmission based on the set of configurations. The method further includes performing the sidelink channel access procedure and transmitting, to at least one other UE, the first sidelink transmission within the channel occupancy upon successfully performing the sidelink channel access procedure.

20 Claims, 9 Drawing Sheets

(51) Int. Cl.
  *H04W 72/12* (2023.01)
  *H04W 74/08* (2009.01)

(56) References Cited

U.S. PATENT DOCUMENTS

| | | | | |
|---|---|---|---|---|
| 2022/0046467 A1* | 2/2022 | Zhang | ............... | H04W 74/0808 |
| 2023/0015310 A1* | 1/2023 | Wu | ............... | H04L 5/0051 |
| 2023/0146718 A1* | 5/2023 | Lei | ............... | H04L 1/1607 |
| | | | | 370/329 |
| 2023/0292345 A1* | 9/2023 | Lei | ............... | H04L 1/1614 |
| 2023/0328784 A1* | 10/2023 | Lei | ............... | H04W 72/25 |
| | | | | 370/329 |

FOREIGN PATENT DOCUMENTS

| | | | |
|---|---|---|---|
| WO | 2020223732 A1 | 11/2020 |
| WO | 2021092902 A1 | 5/2021 |
| WO | 2021093894 A1 | 5/2021 |

OTHER PUBLICATIONS

"3rd Generation Partnership Project; Technical Specification Group Radio Access Network; NR; Physical channels and modulation (Release 16)", 3GPP TS 38.211 V16.6.0, Jun. 2021, 134 pages.
"3rd Generation Partnership Project; Technical Specification Group Radio Access Network; NR; Multiplexing and channel coding (Release 16)", 3GPP TS 38.212 V16.6.0, Jun. 2021, 153 pages.
"3rd Generation Partnership Project; Technical Specification Group Radio Access Network; NR; Physical layer procedures for control (Release 16)", 3GPP TS 38.213 V16.6.0, Jun. 2021, 187 pages.
"3rd Generation Partnership Project; Technical Specification Group Radio Access Network; NR; Physical layer procedures for data (Release 16)", 3GPP TS 38.214 V16.6.0, Jun. 2021, 172 pages.
"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.
Extended European Search Report issued Aug. 26, 2024 regarding Application No. 22849936.4, 11 pages.

* cited by examiner

METHOD AND APPARATUS FOR CHANNEL OCCUPANCY SHARING WITH SIDELINK

CROSS-REFERENCE TO RELATED APPLICATIONS AND CLAIM OF PRIORITY

The present application claims priority to U.S. Provisional Patent Application No. 63/227,858, filed on Jul. 30, 2021. The content of the above-identified patent document is incorporated herein by reference.

TECHNICAL FIELD

The present disclosure relates generally to wireless communication systems and, more specifically, the present disclosure relates to a gNodeB (gNB)'s channel occupancy sharing with a sidelink (SL) in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a gNB's channel occupancy sharing with a SL in a wireless communication system.

In one embodiment, a user equipment (UE) in a wireless communication system is provided. The UE includes a transceiver configured to receive, from a base station (BS), a set of configurations and a processor operably coupled to the transceiver. The processor is configured to determine a channel occupancy initiated by the BS based on the set of configurations, determine a set of resources for a first SL transmission within the channel occupancy based on the set of configurations, determine a SL channel access procedure associated with the first SL transmission based on the set of configurations, and perform the SL channel access procedure. The transceiver is further configured to transmit, to at least one other UE, the first SL transmission within the channel occupancy upon successfully performing the SL channel access procedure.

In another embodiment, a method of a UE in a wireless communication system is provided. The method includes receiving, from a BS, a set of configurations, determining a channel occupancy initiated by the BS based on the set of configurations, determining a set of resources for a first SL transmission within the channel occupancy based on the set of configurations, and determining a SL channel access procedure associated with the first SL transmission based on the set of configurations. The method further includes performing the SL channel access procedure and transmitting, to at least one other UE, the first SL transmission within the channel occupancy upon successfully performing the SL channel access procedure.

In yet another embodiment, a BS in a wireless communication system is provided. The BS includes a processor configured to perform a channel access procedure to initiate a channel occupancy; determine a set of resources for a first SL transmission within the channel occupancy; determine a SL channel access procedure associated with the first SL transmission; and determine a set of configurations to include information on the channel occupancy, the set of resources for the first SL transmission, or the SL channel access procedure associated with the first SL transmission. The BS further includes a transceiver operably coupled to the processer. The transceiver is configured to transmit the set of configurations, to a UE, over a DL channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.16.6.0, "Physical channels and modulation"; 3GPP TS 38.212 v.16.6.0, "Multiplexing and channel coding"; 3GPP TS 38.213 v16.6.0, "NR; Physical Layer Procedures for Control"; 3GPP TS 38.214: v.16.6.0, "Physical layer procedures for data"; and 3GPP TS 38.331 v.16.5.0, "Radio Resource Control (RRC) protocol specification."

Figure 1:
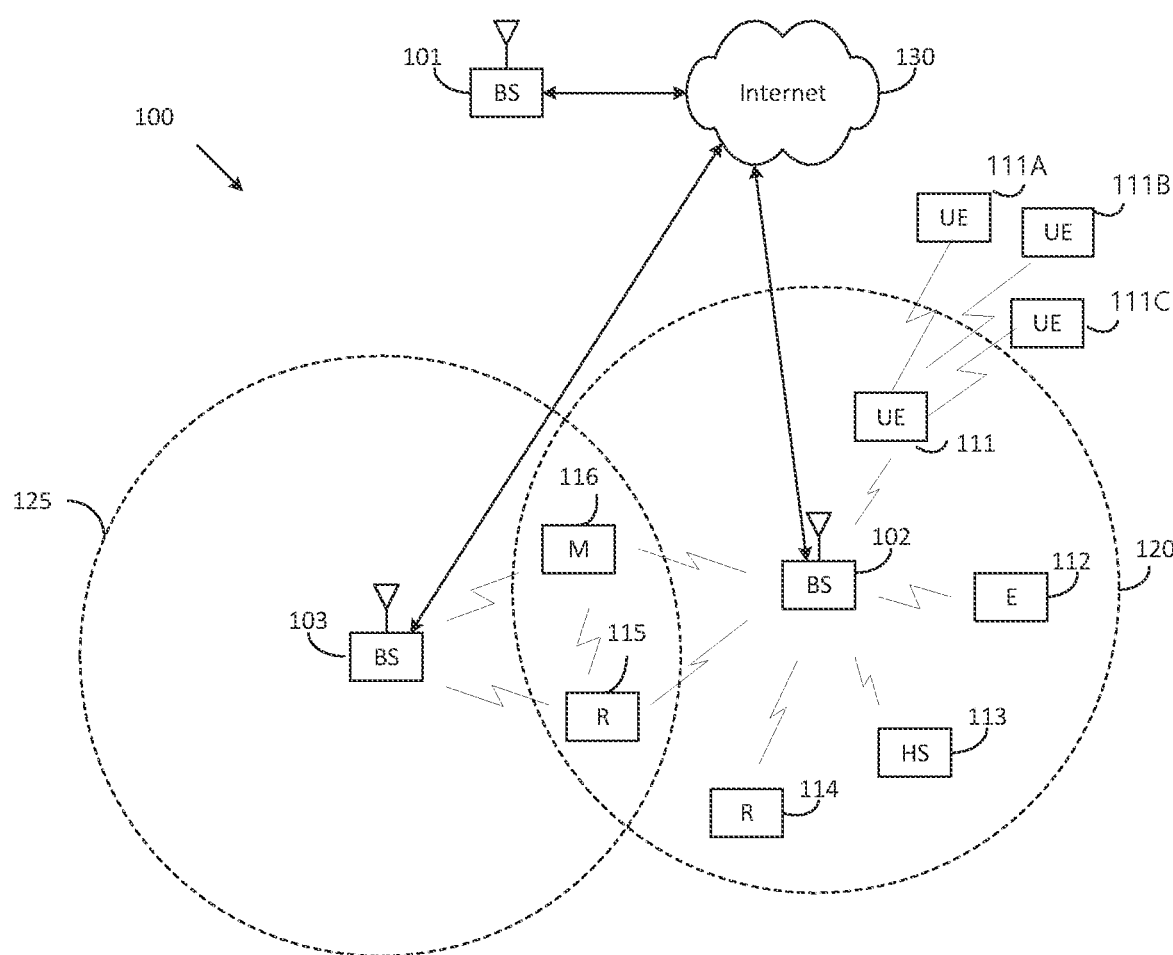
FIG. 1 illustrates an example of wireless network according to various embodiments of the present disclosure.
Figure 2:
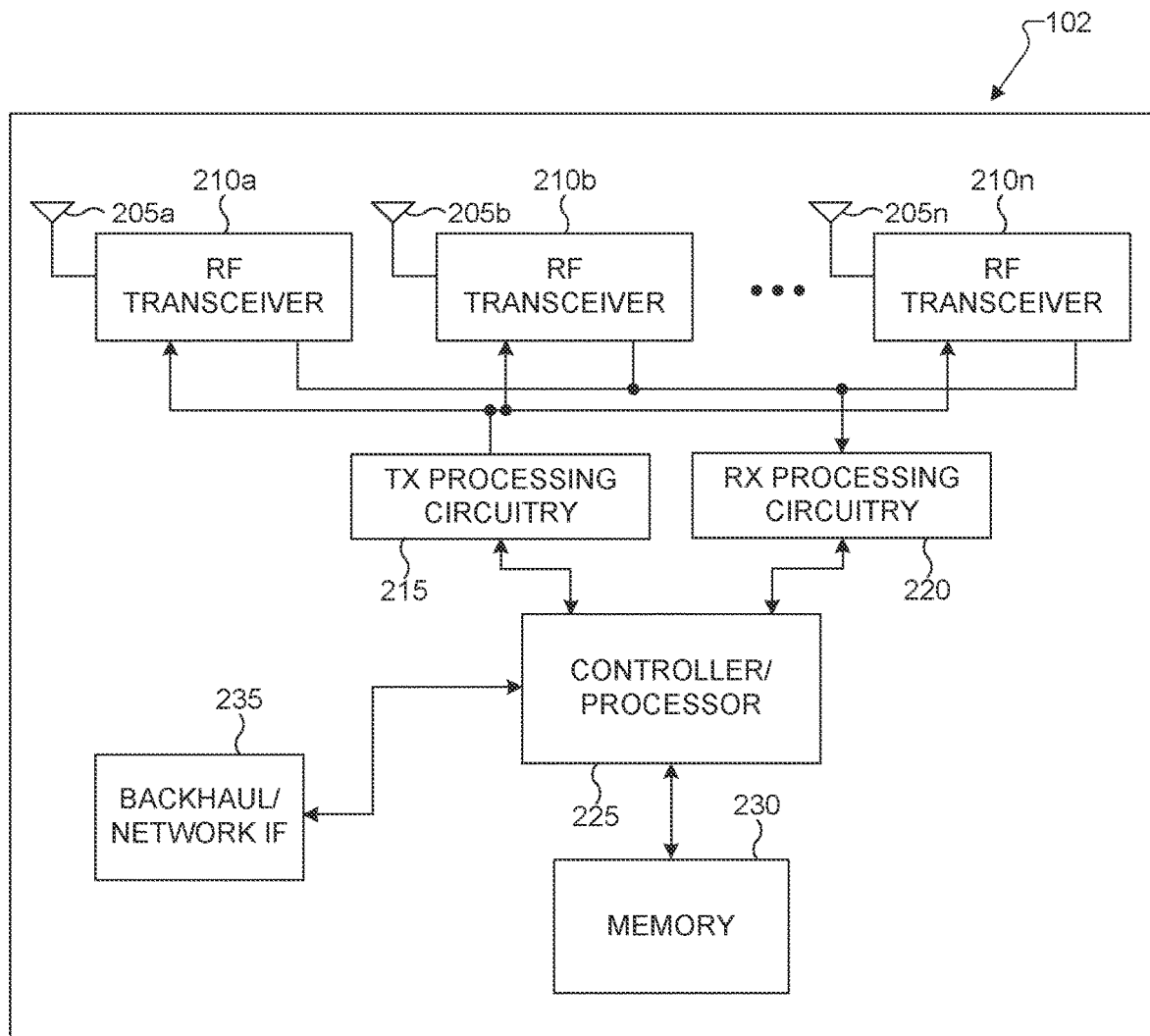
FIG. 2 illustrates an example of gNB according to various embodiments of the present disclosure.
Figure 3:
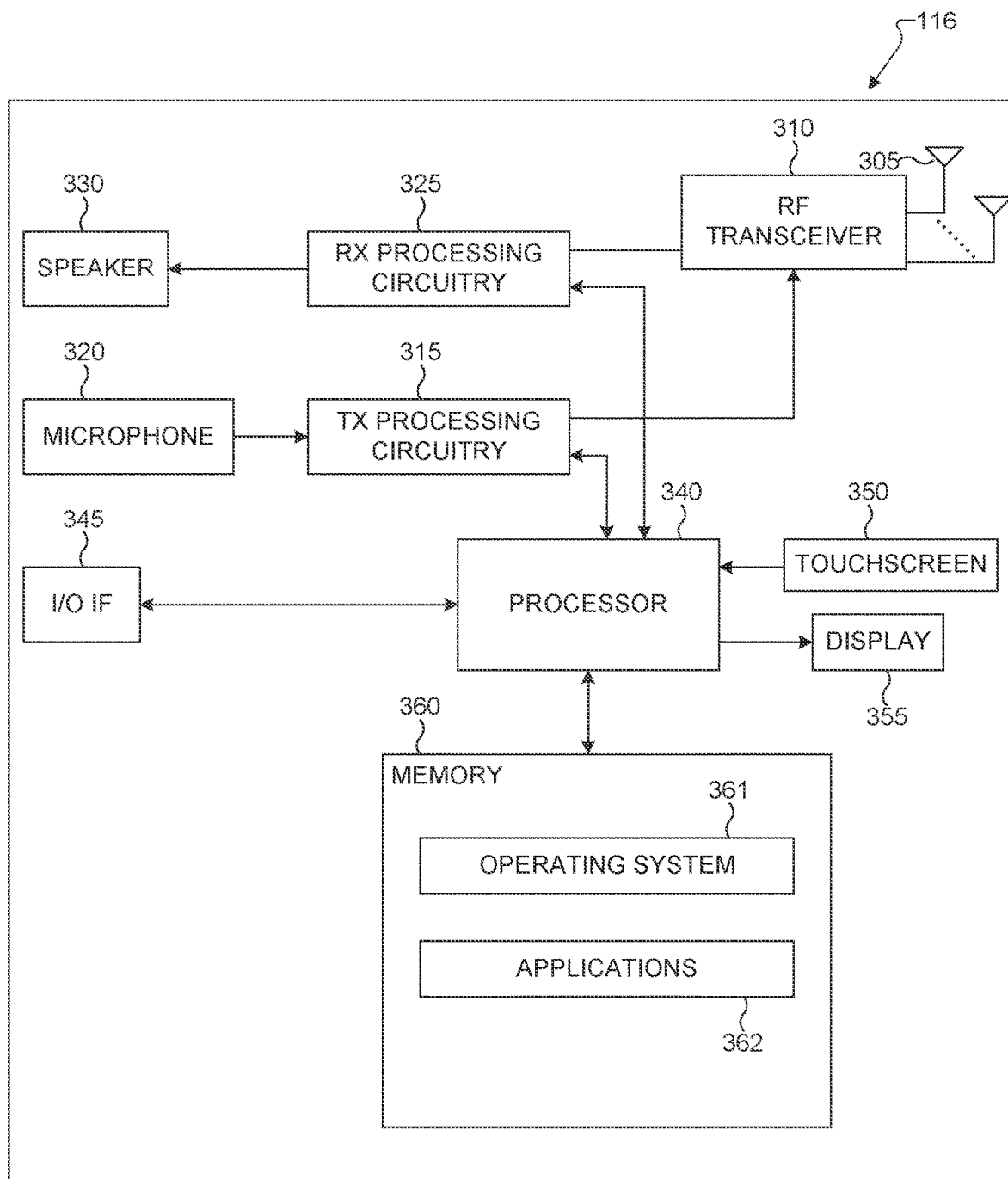
FIG. 3 illustrates an example of UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example of wireless network according to embodiments of the present disclosure. The embodiment of the wireless network shown in FIG. 1 is for illustration only. Other embodiments of the wireless network 100 could be used without departing from the scope of this present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In various embodiments, a UE 116 may communicate with another UE 115 via a SL. For example, both UEs 115-116 can be within network coverage (of the same or different base stations). In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a gNB's channel occupancy sharing with a SL in a wireless communication system. In certain embodiments, and one or more of the gNBs 101-103 includes circuitry, programing, or a combination thereof, for a gNB's channel occupancy sharing with a SL in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs (e.g., via a Uu interface or air interface, which is an interface between a UE and 5G radio access network (RAN)) and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UE 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example of gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a gNB's channel occupancy sharing with a SL in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example of UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100 or by other UEs (e.g., one or more of UEs 111-115) on a SL channel. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL and/or SL channel signals and the transmission of UL and/or SL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a gNB's channel occupancy sharing with a SL in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a DL that refers to transmissions from a base station or one or more transmission points to UEs and an UL that refers to transmissions from UEs to a base station or to one or more reception points and a SL that refers to transmissions from one or more UEs to one or more UEs.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical UL shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
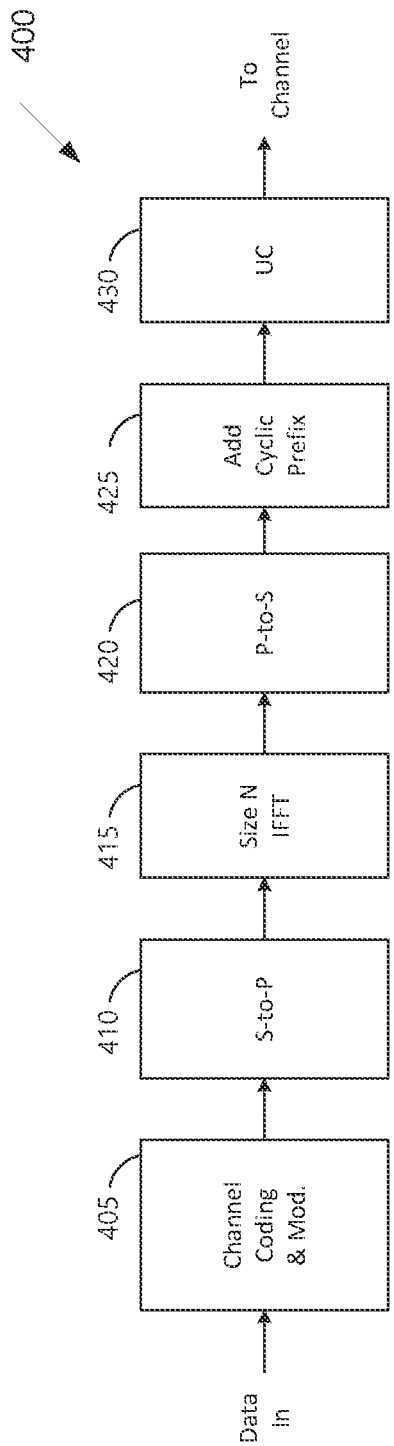
FIGS. 4 and 5 illustrate an example of wireless transmit and receive paths according to various embodiments of the present disclosure.
Figure 5:
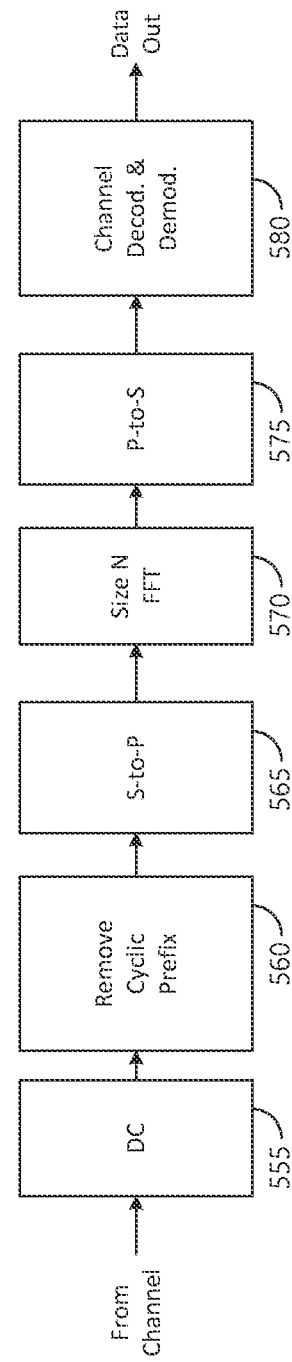

FIG. 4 and FIG. 5 illustrate examples of wireless transmit and receive paths according to this present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support SL measurements in V2X communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the DL to UEs 111-116 and may implement a receive path 500 as illustrated in FIG. 5 that is analogous to receiving in the UL from UEs 111-116. Similarly, each of UEs 111-116 may implement the transmit path 400 for transmitting in the UL to the gNBs 101-103 and/or transmitting in the SL to another UE and may implement the receive path 500 for receiving in the DL from the gNBs 101-103 and/or receiving in the SL from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In Rel-16 new radio on unlicensed spectrum (NR-U), a node (gNB or UE) can initialize a channel occupancy on an operating channel after performing a channel access procedure, wherein the channel access procedure includes at least one sensing slot and the sensing is based on energy detection. In particular, for a single carrier channel access with dynamic channel access (or load-based-equipment (LBE) mode), a gNB can initialize a channel occupancy after performing the Type 1 DL channel access procedure, and a UE can initialize a channel occupancy after performing the Type 1 UL channel access procedure.

In the Type 1 DL/UL channel access procedure, the time duration spanned by the sensing slots that are sensed to be idle before a transmission is random, and the time duration include a first period (e.g., initial CCA period) consisting of a duration of 16 µs and a fixed number (e.g., $m_p$) of sensing slots, and a second period (e.g., extended CCA period) consisting of a random number (e.g., N) of sensing slots, wherein $m_p$ is determined based on the channel access priority class (CAPC) p, and a length of the sensing slot is 9 µs, for 5 GHz and 6 GHz unlicensed spectrum. The random number N is an integer generated uniformly between 0 and $CW_p$, and $CW_p$ is adjusted between a minimum value $CW_{min,p}$ and a maximum value $CW_{max,p}$, according to the CAPC as well. After the Type 1 DL/UL channel access procedure, the node can occupy the channel for a maximum duration $T_{mcot,p}$, which is also based on the CAPC. In Rel-16 NR-U, 4 CAPCs are supported, and the mapping between CAPC (e.g., p) and its associated $m_p$, $CW_{min,p}$, $CW_{max,p}$, $T_{mcot,p}$, and allowed values of $CW_p$ for DL and UL transmissions are shown in TABLE 1A and TABLE 1B, respectively.

Figure 6:
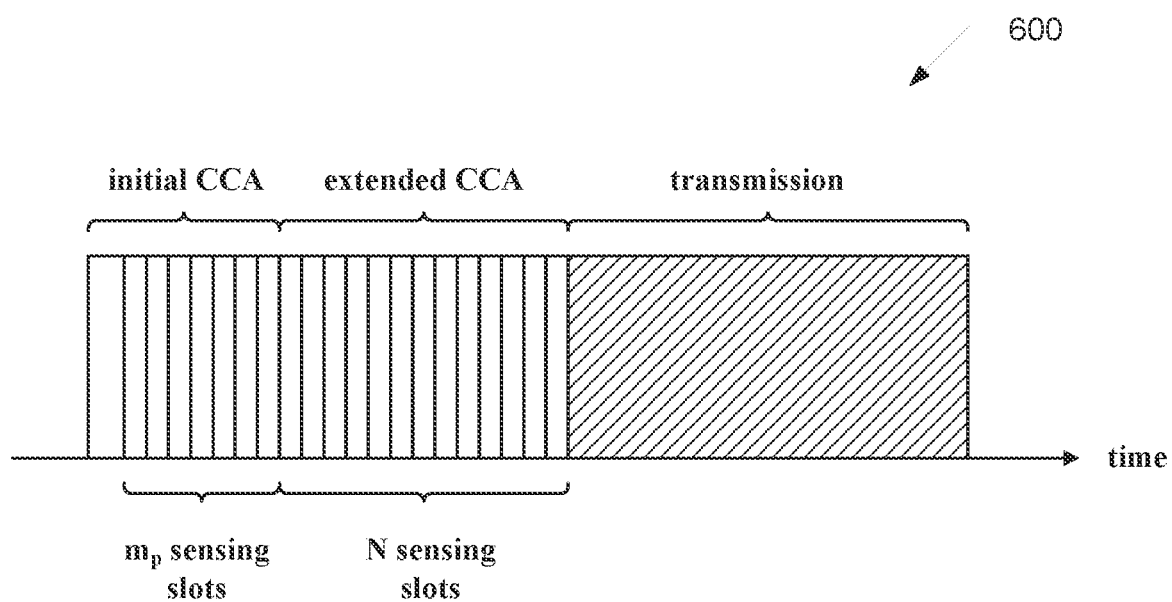
FIG. 6 illustrates an example of Type 1 downlink (DL)/uplink (UL) channel access procedure according to various embodiments of the present disclosure.

FIG. 6 illustrates an example of Type 1 DL/UL channel access procedure 600 according to various embodiments of the present disclosure. An embodiment of the Type 1 DL/UL channel access procedure 600 shown in FIG. 6 is for illustration only.

TABLE 1A shows channel access priority classes for a DL and TABLE 1B shows channel access priority classes for a UL.

TABLE 1A

Channel access priority class for DL

| CAPC (p) | $m_p$ | $CW_{min, p}$ | $CW_{max, p}$ | $T_{mcot, p}$ (ms) | allowed $CW_p$ |
|---|---|---|---|---|---|
| 1 | 1 | 3 | 7 | 2 | {3, 7} |
| 2 | 1 | 7 | 15 | 3 | {7, 15} |
| 3 | 3 | 15 | 63 | 8 or 10 | {15, 31, 63} |
| 4 | 7 | 15 | 1023 | 8 or 10 | {15, 31, 63, 127, 255, 511, 1023} |

TABLE 1B

Channel access priority class for UL

| CAPC (p) | $m_p$ | $CW_{min, p}$ | $CW_{max, p}$ | $T_{mcot, p}$ (ms) | allowed $CW_p$ |
|---|---|---|---|---|---|
| 1 | 1 | 3 | 7 | 2 | {3, 7} |
| 2 | 1 | 7 | 15 | 3 | {7, 15} |
| 3 | 3 | 15 | 1023 | 6 or 10 | {15, 31, 63, 127, 255, 511, 1023} |
| 4 | 7 | 15 | 1023 | 6 or 10 | {15, 31, 63, 127, 255, 511, 1023} |

A gNB can share its initialized channel occupancy (CO) with its serving UE(s), wherein the gNB indicates the type of channel access procedure for the UE(s) according to the gap between the DL and UL transmission.

For one example, the CO only includes one switching point between DL and UL transmissions, such that the CO starts with gNB's DL transmission and proceeds with UE(s)' UL transmission, with a potential gap between the DL and UL transmission. For this example, the gNB can indicate the UE a type of channel access procedure based on the duration of the gap.

In one example of UL-LBT-1, if the gap is up to 16 µs, the gNB can indicate the UE a Type 2C UL channel access procedure, wherein the time duration of sensing before the transmission is 0 (i.e., no sensing), and the maximum UL transmission duration subject to this type of channel access procedure is 584 µs.

In one example of UL-LBT-2, if the gap is 16 µs, the gNB can indicate the UE a Type 2B UL channel access procedure, wherein the time duration including the sensing slot(s) that are sensed to be idle before a transmission is 16 µs.

In one example of UL-LBT-3, if the gap is larger or equals to 25 µs, the gNB can indicate the UE a Type 2A UL channel access procedure, wherein the time duration including the sensing slot(s) that are sensed to be idle before a transmission is 25 µs.

For another example, the CO can include multiple switching points between DL and UL transmissions, wherein the gap between any transmissions is no larger than 25 µs. For this example, the gNB can perform a type of channel access procedure based on the duration of the gap between a UL transmission and a DL transmission.

In one example of DL-LBT-1, if the gap is up to 16 µs, the gNB can perform a Type 2C DL channel access procedure, wherein the time duration of sensing before the transmission is 0 (i.e., no sensing), and the maximum DL transmission duration subject to this type of channel access procedure is 584 µs.

In one example of DL-LBT-2, if the gap is 16 µs, the gNB can perform a Type 2B DL channel access procedure, wherein the time duration including the sensing slot(s) that are sensed to be idle before a transmission is 16 µs.

In one example of DL-LBT-3, if the gap is 25 µs, the gNB can perform a Type 2A DL channel access procedure, wherein the time duration including the sensing slot(s) that are sensed to be idle before a transmission is 25 µs.

Moreover, the gNB can indicate the UE a type of channel access procedure based on the duration of the gap according to one of Example UL-LBT-1, Example UL-LBT-2, or Example UL-LBT-3.

A UE can also share its initialized channel occupancy (CO) with the gNB, wherein the gNB can determine the type of channel access procedure according to the gap between the UL and DL transmission. In Rel-16 NR-U, only single switching point between the UL transmission and DL transmission is allowed, and the gNB's DL transmission may contain transmission to the UE initializes the CO and can further include non-unicast and/or unicast transmissions where any unicast transmission is only transmitted to the UE initializes the CO. For this example, the gap between the UL and DL transmission cannot exceed 25 µs, and the gNB can perform a type of channel access procedure based on the duration of the gap, according to one of Example DL-LBT-1, Example DL-LBT-2, or Example DL-LBT-3.

In Rel-16 NR SL, transmission and reception of signals and channels on SL are supported. The channels on SL include physical SL shared channel (PSSCH), physical SL control channel (PSCCH), and physical SL broadcast channel (PSBCH), and the signals on SL include SL primary synchronization signal (S-PSS), SL secondary synchronization signal (S-SSS), de-modulation reference signal (DM-RS), channel state information reference signal (CSI-RS), and phase tracking reference signal (PT-RS).

For a SL operating with shared spectrum channel access, there is a need to support the channel occupancy sharing including the SL transmission. A gNB can initialize a CO on DL channel and share the CO with other UE(s) for SL or UL transmission(s). The present disclosure focuses on the conditions to support CO sharing, wherein the CO is initialized by a gNB.

The present disclosure focuses on channel occupancy initialized by a gNB and shared with other node(s) for DL, SL, and/or UL transmission(s). More precisely, this disclosure includes the following components: (1) CO sharing between DL and SL; (2) CO sharing among DL, SL, and UL; (3) CO sharing with another gNB; and (4) CO sharing in more than one CO.

For a SL operating with shared spectrum channel access, at least one of the following SL channel access procedures can be supported.

In one example of Type 1 SL channel access procedure, the time duration spanned by the sensing slots that are sensed to be idle before a SL transmission is random, wherein the number of sensing slots can be determined based on a counter, and this type of channel access procedure can be applicable to any transmission(s) initialized by a UE on SL.

In one example of Type 2A SL channel access procedure, a UE may transmit a SL transmission immediately after sensing the channel to be idle for at least a sensing interval of 25 µs.

In one example of Type 2B SL channel access procedure, a UE may transmit a SL transmission immediately after sensing the channel to be idle for at least a sensing interval of 16 µs.

In one example of Type 2C SL channel access procedure, a UE may transmit a SL transmission immediately without sensing the channel. In one further consideration, the duration of the SL transmission after performing the Type 2C SL channel access procedure is at most 584 µs.

For a SL operating with shared spectrum channel access, at least one of the following examples can be utilized by a UE to start a transmission burst within a channel occupancy.

In one example of SL-LBT-1, if a UE can determine the duration of a gap between its intended SL transmission and the previous transmission on the channel to be up to 16 µs, the UE may perform the SL transmission(s) on the channel after performing Type 2C SL channel access procedure.

In one example of SL-LBT-2, if a UE can determine the duration of a gap between its intended SL transmission and the previous transmission on the channel to be 16 µs, the UE may perform the SL transmission(s) on the channel after performing Type 2B SL channel access procedure.

In one example of SL-LBT-3, if a UE can determine the duration of a gap between its intended SL transmission and the previous transmission on the channel to be at least 25 µs, the UE may perform the SL transmission(s) on the channel after performing Type 2A SL channel access procedure. In one variant of this example, if there is a further condition on the gap to be at most 25 µs, then the UE may perform the SL transmission(s) on the channel after performing Type 2A SL channel access procedure if the gap is 25 µs.

In one example of SL-LBT-4, if a gap between a UE's intended SL transmission and the previous transmission on the channel is up to 16 µs, the UE can be indicated with a Type 2C SL channel access procedure and may perform the SL transmission(s) on the channel after performing the Type 2C SL channel access procedure.

In one example of SL-LBT-5, if a gap between a UE's intended SL transmission and the previous transmission on the channel is 16 µs, the UE can be indicated with a Type 2B SL channel access procedure and may perform the SL transmission(s) on the channel after performing the Type 2B SL channel access procedure.

In one example of SL-LBT-6, if a gap between a UE's intended SL transmission and the previous transmission on the channel is at least 25 µs, the UE can be indicated with a Type 2A SL channel access procedure and may perform the SL transmission(s) on the channel after performing the Type 2A SL channel access procedure. In one variant of this example, if there is a further condition on the gap to be at most 25 µs, then the UE can be indicated with a Type 2A SL channel access procedure and may perform the SL transmission(s) on the channel after performing the Type 2A SL channel access procedure if the gap is 25 µs.

For a SL operating with shared spectrum channel access, at least one of the following examples can be applicable for a SL transmission burst.

In one example of SL-Burst-1, the burst of SL transmission can include at least one of PSSCH, PSCCH, PSFCH (e.g., to a particular UE), S-SSB, and their associated RS, and the SL signal(s) and channel(s) in the SL transmission(s) can be multiplexed into a burst with the assumption that any time domain gap within the burst is not larger than a predefined threshold (e.g., 16 µs). For one instance, the SL transmission burst can be a PSFCH transmission. For another instance, the SL transmission burst can be a PSSCH and PSCCH transmission.

In one example of SL-Burst-2, the PSSCH/PSCCH included in the SL transmission burst conveys broadcast information.

In one example of SL-Burst-3, the PSSCH/PSCCH included in the SL transmission burst conveys groupcast information, wherein the group of UE(s) for the reception of the PSSCH/PSCCH includes a particular UE.

In one example of SL-Burst-4, the PSSCH/PSCCH included in the SL transmission burst conveys unicast information, wherein the UE for the reception of the PSSCH/PSCCH is a particular UE.

In one example of SL-Burst-5, the PSSCH/PSCCH included in the SL transmission burst does not convey groupcast information, wherein the group of UE(s) for the reception of the PSSCH/PSCCH does not include a particular UE.

In one example of SL-Burst-6, the PSSCH/PSCCH included in the SL transmission burst does not convey unicast information, wherein the UE for the reception of the PSSCH/PSCCH is not a particular UE.

For a SL and/or UL operating with shared spectrum channel access, a UE can perform a channel access procedure to perform transmission(s) including at least one of SL or UL transmission (e.g., SL transmission and UL transmission are IFDMed and mapped to different interlaces in the frequency domain, or SL transmission and UL transmission are TDMed in a burst to make the time domain gap no larger than a predefined threshold, or SL transmission and UL transmission are FDMed into a burst, or SL transmission and UL transmission are CDMed into a burst), and at least one of the following UL/SL channel access procedures can be supported for a transmission burst including SL and/or UL transmission.

In one instance, whether the UL/SL transmission is multiplexed from at least one of SL or UL transmission using interlace based resource allocation can be a UE capability. In another instance, whether the UL/SL transmission is multiplexed from at least one of SL or UL transmission using interlace based resource allocation can be indicated by the gNB (e.g., using a higher layer parameter and/or using a pre-configuration).

In Type 1 UL/SL channel access procedure, the time duration spanned by the sensing slots that are sensed to be idle before a SL transmission is random, wherein the number of sensing slots is determined based a counter, and this type of channel access procedure can be applicable to any UL/SL transmission(s) initialized by a UE.

In Type 2A UL/SL channel access procedure, a UE may transmit a SL transmission immediately after sensing the channel to be idle for at least a sensing interval of 25 μs.

In Type 2B UL/SL channel access procedure, a UE may transmit a SL transmission immediately after sensing the channel to be idle for at least a sensing interval of 16 μs.

In Type 2A UL/SL channel access procedure, a UE may transmit a SL transmission immediately without sensing the channel. In one further consideration, the duration of the SL transmission after performing the Type 2A UL/SL channel access procedure is at most 584 μs.

For a SL and/or UL operating with shared spectrum channel access, at least one of the following examples can be utilized by a UE to start a UL/SL multiplexed transmission burst (e.g., IFDMed, FDMed, TDMed, or CDMed) within a channel occupancy.

In one example of UL-SL-LBT-1, if a UE can determine the duration of a gap between its intended UL/SL transmission and the previous transmission on the channel to be up to 16 μs, the UE may perform the UL/SL transmission(s) on the channel after performing Type 2C UL/SL channel access procedure.

In one example of UL-SL-LBT-2, if a UE can determine the duration of a gap between its intended UL/SL transmission and the previous transmission on the channel to be 16 μs, the UE may perform the UL/SL transmission(s) on the channel after performing Type 2B UL/SL channel access procedure.

In one example of UL-SL-LBT-3, if a UE can determine the duration of a gap between its intended UL/SL transmission and the previous transmission on the channel to be at least 25 μs, the UE may perform the UL/SL transmission(s) on the channel after performing Type 2A UL/SL channel access procedure. In one variant of this example, if there is a further condition on the gap to be at most 25 μs, then the UE may perform the UL/SL transmission(s) on the channel after performing Type UL/2A SL channel access procedure if the gap is 25 μs.

In one example of UL-SL-LBT-4, if a gap between a UE's intended UL/SL transmission and the previous transmission on the channel is up to 16 μs, the UE can be indicated with a Type 2C UL/SL channel access procedure and may perform the SL transmission(s) on the channel after performing the Type 2C UL/SL channel access procedure.

In one example of UL-SL-LBT-5, if a gap between a UE's intended UL/SL transmission and the previous transmission on the channel is 16 μs, the UE can be indicated with a Type 2B UL/SL channel access procedure and may perform the UL/SL transmission(s) on the channel after performing the Type 2B UL/SL channel access procedure.

In one example of UL-SL-LBT-6, if a gap between a UE's intended UL/SL transmission and the previous transmission on the channel is at least 25 μs, the UE can be indicated with a Type 2A UL/SL channel access procedure and may perform the UL/SL transmission(s) on the channel after performing the Type 2A UL/SL channel access procedure. In one variant of this example, if there is a further condition on the gap to be at most 25 μs, then the UE can be indicated with a Type 2A UL/SL channel access procedure and may perform the UL/SL transmission(s) on the channel after performing the Type 2A UL/SL channel access procedure if the gap is 25 μs.

For an UL and/or SL operating with shared spectrum channel access, at least one of the following examples can be applicable for a UL/SL multiplexed transmission burst (e.g., IFDMed, FDMed, TDMed, or CDMed).

In one example of UL-SL-Burst-1, the burst of UL/SL transmission can be multiplexed into a burst with the assumption that any time domain gap within the burst is not larger than a predefined threshold (e.g., 16 μs). For one instance, the UL/SL transmission burst can include PSSCH and/or PSCCH transmission. For another instance, the UL/SL transmission burst can include PSFCH transmission (e.g., to a particular UE).

In one example of UL-SL-Burst-2, the PSSCH/PSCCH included in the SL transmission within the UL/SL burst conveys broadcast information.

In one example of UL-SL-Burst-3, the PSSCH/PSCCH included in the SL transmission within the UL/SL burst conveys groupcast information, wherein the group of UE(s) for the reception of the PSSCH/PSCCH includes a particular UE.

In one example of UL-SL-Burst-4, the PSSCH/PSCCH included in the SL transmission within the UL/SL burst conveys unicast information, wherein the UE for the reception of the PSSCH/PSCCH is a particular UE.

In one example of UL-SL-Burst-5, the PSSCH/PSCCH included in the SL transmission within the UL/SL burst does not convey groupcast information, wherein the group of UE(s) for the reception of the PSSCH/PSCCH does not include a particular UE.

In one example of UL-SL-Burst-6, the PSSCH/PSCCH included in the SL transmission within the UL/SL burst does not convey unicast information, wherein the UE for the reception of the PSSCH/PSCCH is not a particular UE.

In one embodiment, a gNB can initialize a channel occupancy for DL transmission(s) and share the CO with at least one UE for SL transmission(s).

In one example, the gNB performs a Type 1 DL channel access procedure to initialize the channel occupancy for DL transmission(s).

Figure 7:
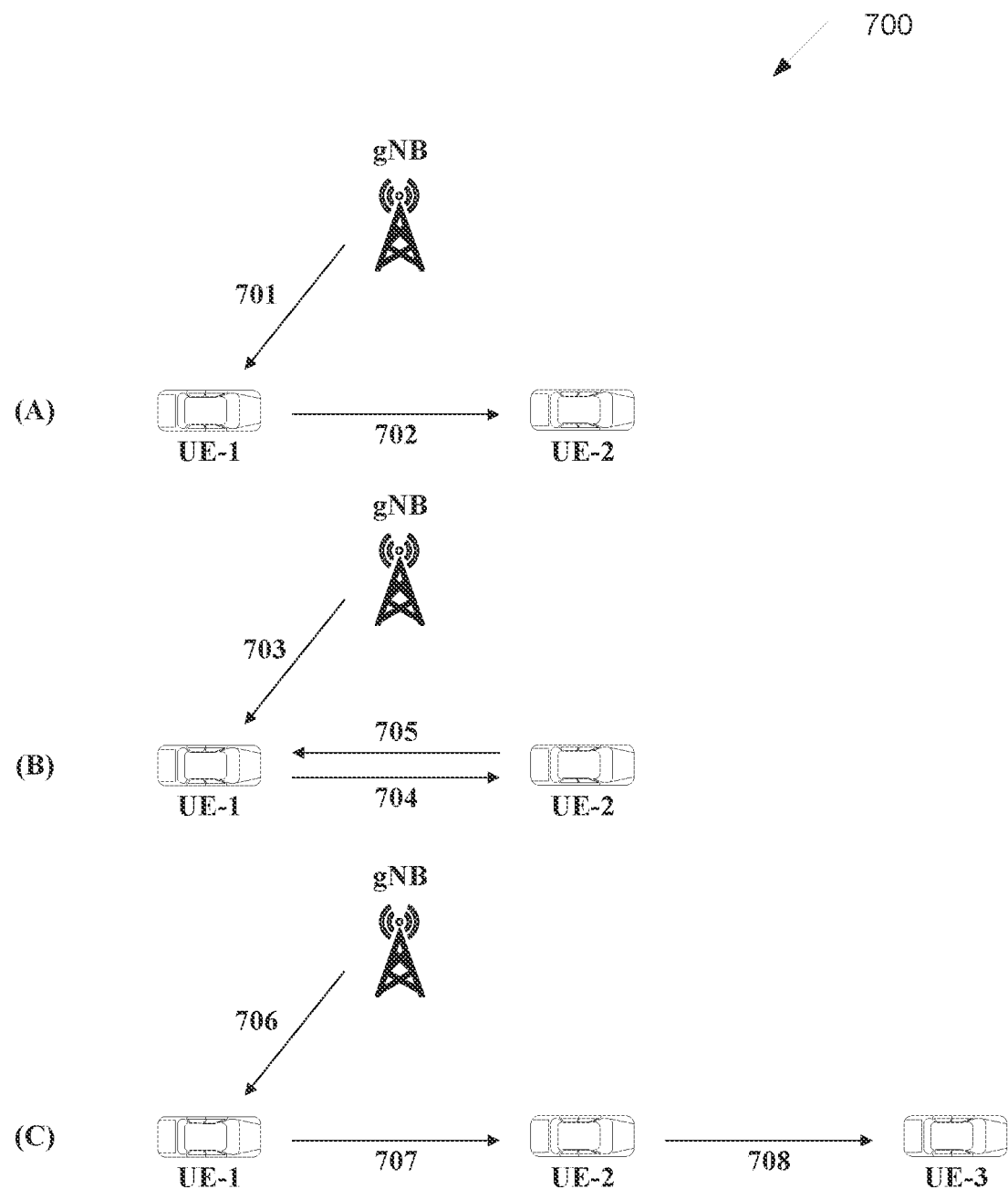
FIG. 7 illustrates an example of channel occupancy (CO) sharing between DL and SL transmissions according to various embodiments of the present disclosure.

FIG. 7 illustrates an example of CO sharing between DL and SL transmissions 700 according to various embodiments of the present disclosure. An embodiment of the CO sharing between DL and SL transmissions 700 shown in FIG. 7 is for illustration only.

In one example, a gNB, in step 701, initializes the channel occupancy for DL transmission(s) to a first set of UEs (e.g., UE-1), and at least one UE in the first set of UE(s) (e.g., UE-1) shares, in step 702, the CO and performs SL transmission(s) to a second set of UE(s) (e.g., UE-2). This example is shown in FIG. 7 (e.g., (A) of FIG. 7), wherein the first set of UE(s) and the second set of UE(s) only include one UE for illustration purpose only, and both sets could include multiple UEs in this example.

In one instance, the DL transmission(s) from the gNB to the first set of UE(s) (e.g., UE-1) include at least time domain resource allocation for the SL transmission(s) from the first set of UE(s) (e.g., UE-1) to the second set of UE(s) (e.g., UE-2), and the SL transmission(s) from the first set of UE(s) (e.g., UE-1) to the second set of UE(s) (e.g., UE-2) can be performed on the configured resources from the gNB, wherein the transmission(s) can be performed directly (e.g., in resource allocation mode 1) or additionally conditioned based on the result of SL resource sensing and/or selection (e.g., in resource allocation mode 2).

In another example, a gNB initializes the channel occupancy for DL transmission(s) to a first set of UEs (e.g., UE-1), and at least one UE in the first set of UEs (e.g., UE-1) shares the CO and performs SL transmission(s) to a second set of UE(s) (e.g., UE-2), and at least one UE in the second set of UE(s) (e.g., UE-2) can further share the CO and performs SL transmission(s).

In one sub-example, in step 704 and step 705, the SL transmission(s) from the at least one UE in the second set of UE(s) (e.g., UE-2) is to at least one UE in the first set of UE(s) (e.g., UE-1). This example is shown in FIG. 7 (e.g., (B) of FIG. 7), wherein the first set of UE(s) and the second set of UE(s) only include one UE for illustration purpose only, and both sets could include multiple UEs in this example. In one instance, the DL transmission(s) from the gNB, in step 703, to the first set of UE(s) (e.g., UE-1) include at least time domain resource allocation for the SL transmission(s) from the first set of UE(s) (e.g., UE-1) to the second set of UE(s) (e.g., UE-2), and the SL transmission(s) from the first set of UE(s) (e.g., UE-1) to the second set of UE(s) (e.g., UE-2) can be performed on the configured resources from the gNB, wherein the transmission(s) can be performed directly (e.g., in resource allocation mode 1) or additionally conditioned based on the result of SL resource sensing and/or selection (e.g., in resource allocation mode 2).

In another instance, the DL transmission(s) from the gNB to the first set of UE(s) (e.g., UE-1) include at least time domain resource allocation for the SL transmission(s) from the second set of UE(s) (e.g., UE-2) to the first set of UE(s) (e.g., UE-1), and the SL transmission(s) from the second set of UE(s) (e.g., UE-2) to the first set of UE(s) (e.g., UE-1) are performed on the configured resources from the gNB, wherein the transmission(s) can be performed directly (e.g., in resource allocation mode 1) or additionally conditioned based on the result of SL resource sensing and/or selection (e.g., in resource allocation mode 2).

In another sub-example, in step 708, the SL transmission(s) from the at least one UE in the second set of UE(s) (e.g., UE-2) is to a third set of UE(s) (e.g., UE-3). This example is shown in FIG. 7 (e.g., (C) of FIG. 7), wherein the first set of UE(s) and the second set of UE(s) only include one UE for illustration purpose only, and both sets could include multiple UEs in this example. In one instance, the DL transmission(s), in step 706, from the gNB to the first set of UE(s) (e.g., UE-1) include at least time domain resource allocation for the SL transmission(s) from the first set of UE(s) (e.g., UE-1) to the second set of UE(s) (e.g., UE-2), in step 707, and the SL transmission(s) from the first set of UE(s) (e.g., UE-1) to the second set of UE(s) (e.g., UE-2) are performed on the configured resources from the gNB, wherein the transmission(s) can be performed directly (e.g., in resource allocation mode 1) or additionally conditioned based on the result of SL resource sensing and/or selection (e.g., in resource allocation mode 2).

In another instance, the DL transmission(s) from the gNB to the first set of UE(s) (e.g., UE-1) include at least time domain resource allocation for the SL transmission(s) from the second set of UE(s) (e.g., UE-2) to the third set of UE(s) (e.g., UE-3), and the SL transmission(s) from the second set of UE(s) (e.g., UE-2) to the third set of UE(s) (e.g., UE-3) are performed on the configured resources from the gNB, wherein the transmission(s) can be performed directly (e.g., in resource allocation mode 1) or additionally conditioned based on the result of SL resource sensing and/or selection (e.g., in resource allocation mode 2).

In yet another sub-example, the SL transmission(s) from the at least one UE in the second set of UE(s) (e.g., UE-2) can be the combination of the above two sub-examples in FIG. 7 (e.g., (B) and (C) of FIG. 7), e.g., to at least one UE in the first set of UE(s) (e.g., UE-1) and/or a third set of UE(s) (e.g., UE-3).

In one example, the gNB initializing the CO cannot continue to transmit after a UE shares the CO and transmits (e.g., there is at most one switching point from the gNB perspective).

In one sub-example, there is a further condition on the duration of the gap between the gNB's transmission(s) and the proceeding SL transmission(s). For one instance, the duration of the gap cannot exceed a pre-defined threshold (e.g., 25 μs).

In another sub-example, there is a further condition on the duration of the gap between SL transmission(s). For one instance, the duration of the gap cannot exceed a pre-defined threshold (e.g., 16 μs or 25 μs).

In one example, the gNB initializing the CO can continue to transmit after a UE shares the CO and transmits (e.g., no limitation on the number of switching points from the gNB perspective).

In one sub-example, there is a further condition on the duration of the gap(s) between the transmission bursts. For one instance, the duration of any gap between transmission bursts cannot exceed a pre-defined threshold (e.g., 25 μs).

In another sub-example, there is no condition on the duration of the gap(s) between the transmission bursts. For one instance, the duration of gap(s) is not counted into the channel occupancy time.

In another example, whether the CO initialized by the gNB can continue to transmit after other node shares the CO and transmits can be provided to the UE, e.g., configured by a higher layer parameter and/or provided by a pre-configuration.

In yet another example, for this embodiment to be supported, there can be a further condition on the priority of SL transmission(s). For one instance, if the priority of intended SL transmission(s) is at least one of the same as or higher than the priority of the current SL transmission(s), the CO can be shared to perform the intended SL transmission(s).

In yet another example, whether the CO initialized by the gNB can be shared with other nodes can be based on a further condition on the number or duration of failures in the channel access procedure. For one instance, if the number of failures in the channel access procedure exceeds a pre-defined threshold, the CO can be shared with other nodes after a successful channel access procedure. For another instance, if the duration of failures in the channel access procedure exceeds a predefined threshold, the CO can be shared with other nodes after a successful channel access procedure.

In one example, for this embodiment to be supported, there is a further condition on the UE(s). For instance, at least one of the first set of UE(s) (e.g., UE-1), the second set of UE(s) (e.g., UE-2), or the third set of UE(s) (e.g., UE-3) is within the coverage of the gNB.

In one example, for this embodiment to be supported, there is a further condition on the SL transmission(s). For one instance, at least one of the examples on SL transmission burst described in this disclosure needs to be satisfied (e.g., Example SL-Burst-1 to SL-Burst-6), given the particular UE(s) as the receiver(s) of the corresponding SL transmission(s) in the examples. For one instance, the SL transmission(s), e.g., the SL transmission(s) from the first set of UE(s) (e.g., UE-1) to the second set of UE(s) (e.g., UE-2), and/or the SL transmission(s) from the second set of UE(s) (e.g., UE-2) to the first set of UE(s) (e.g., UE-1) if applicable, and/or the SL transmission(s) from the second set of UE(s) (e.g., UE-2) to the third set of UE(s) (e.g., UE-3) if applicable, may not include unicast information or groupcast information to UE(s) other than the set of UE(s) as the receiver(s) of the DL transmission.

In another example, if the gNB initializing the CO can continue to transmit after a UE shares the CO and transmits (e.g., no limitation on the number of switching points from the gNB perspective), for this embodiment to be supported, there is a further condition on the DL transmission(s). For one instance, the DL transmission may include non-unicast information and/or unicast information only to the UE(s) involved in the SL transmission(s) in the CO.

In one example, if the gNB initializing the CO can continue to transmit after a UE shares the CO and transmits (e.g., no limitation on the number of switching points from the gNB perspective), for the gap(s) between gNB's transmission(s) and the previous SL transmission(s), depending on the duration of the gap, the gNB may perform transmission on the DL after performing channel access procedure given by at least one of the examples described in this disclosure (e.g., Example DL-LBT-1 to DL-LBT-3).

In another example, for the gap(s) before SL transmission(s), depending on the duration of the gap, the UE may perform transmission on the SL after performing channel access procedure given by at least one of the examples described in this disclosure (e.g., Example SL-LBT-1 to SL-LBT-6).

In yet another example, if an indication on the SL energy detection threshold is not provided (e.g., by a higher layer parameter and/or by a pre-configuration), at least one of the SL transmission(s) cannot include unicast transmission(s). For one instance, there is a further constraint on the duration of the SL transmission(s), e.g., no more than 2, 4, or 8 symbols for the SCS of SL BWP as 15, 30, or 60 kHz, respectively.

In yet another example, if an indication on the DL energy detection threshold is not provided (e.g., by a higher layer parameter and/or by a pre-configuration), the DL transmission(s) cannot include unicast transmission(s). For one instance, there is a further constraint on the duration of the DL transmission(s), e.g., no more than 2, 4, or 8 symbols for the SCS of SL BWP as 15, 30, or 60 kHz, respectively.

In one embodiment, a gNB can initialize a channel occupancy for DL transmission(s) and share the CO with at least one UE for SL and/or UL transmission(s).

In one example, the gNB performs a Type 1 DL channel access procedure to initialize the channel occupancy for DL transmission(s).

Figure 8:
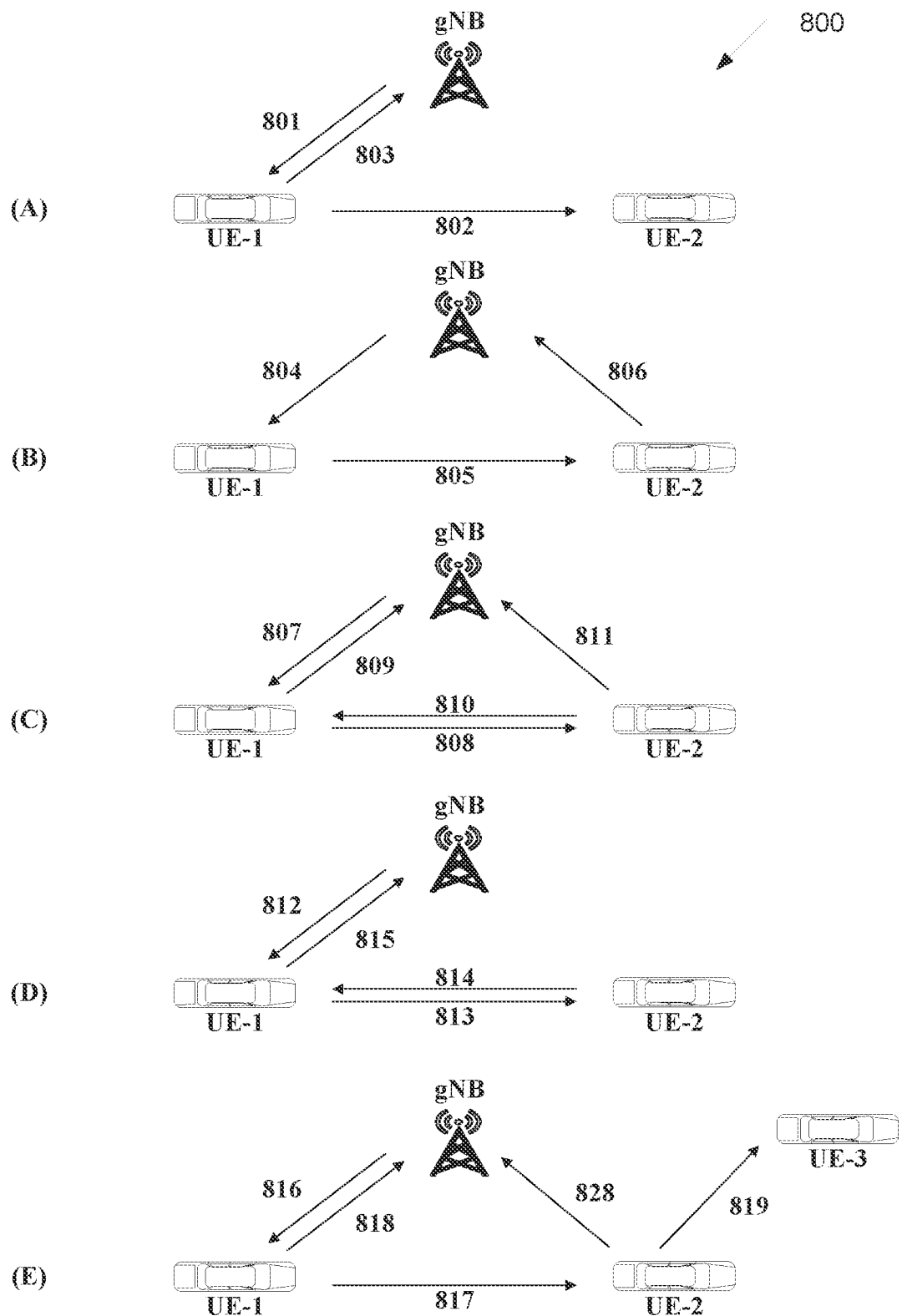
FIG. 8 illustrates an example of CO sharing among DL, SL, and UL according to various embodiments of the present disclosure.

FIG. 8 illustrates an example of CO sharing among DL, SL, and UL 800 according to various embodiments of the present disclosure. An embodiment of the CO sharing among DL, SL, and UL 800 shown in FIG. 8 is for illustration only.

In one example, a gNB, in step 801, initializes the channel occupancy for DL transmission(s) to a first set of UEs (e.g., UE-1), and at least one UE in the first set of UE(s) (e.g., UE-1), in step 803, shares the CO and performs at least one of an UL or SL transmission(s) to the gNB or a second set of UE(s) (e.g., UE-2), in step 802, respectively, wherein the UL and SL transmission(s) can be multiplexed if both of them are transmitted, e.g., TDMed, FDMed, IFDMed, or CDMed. This example is shown in FIG. 8 (e.g., (A) of FIG. 8), wherein the first set of UE(s) and the second set of UE(s) only include one UE for illustration purpose only, and both sets could include multiple UEs in this example.

In one instance, the DL transmission(s) from the gNB to the first set of UE(s) (e.g., UE-1) include at least time domain resource allocation for the SL transmission(s) from the first set of UE(s) (e.g., UE-1) to the second set of UE(s) (e.g., UE-2), and the SL transmission(s) from the first set of UE(s) (e.g., UE-1) to the second set of UE(s) (e.g., UE-2) can be performed on the configured resources from the gNB, wherein the transmission(s) can be performed directly (e.g., in resource allocation mode 1) or additionally conditioned based on the result of SL resource sensing and/or selection (e.g., in resource allocation mode 2).

In another example, a gNB, in step 804, initializes the channel occupancy for DL transmission(s) to a first set of UEs (e.g., UE-1), and at least one UE in the first set of UE(s) (e.g., UE-1) shares, in step 805, the CO and performs SL transmission(s) to a second set of UE(s) (e.g., UE-2), and at least one UE in the second set of UE(s) (e.g., UE-2) further shares the CO and performs UL transmission(s) to the gNB, in step 806. This example is shown in FIG. 8 (e.g., (B) of FIG. 8), wherein the first set of UE(s) and the second set of UE(s) only include one UE for illustration purpose only, and both sets could include multiple UEs in this example.

In one instance, the DL transmission(s) from the gNB to the first set of UE(s) (e.g., UE-1) include at least time domain resource allocation for the SL transmission(s) from the first set of UE(s) (e.g., UE-1) to the second set of UE(s) (e.g., UE-2), and the SL transmission(s) from the first set of UE(s) (e.g., UE-1) to the second set of UE(s) (e.g., UE-2) can be performed on the configured resources from the gNB, wherein the transmission(s) can be performed directly (e.g., in resource allocation mode 1) or additionally conditioned based on the result of SL resource sensing and/or selection (e.g., in resource allocation mode 2).

In yet another example, a gNB, in step 807, initializes the channel occupancy for DL transmission(s) to a first set of UEs (e.g., UE-1), and at least one UE in the first set of UE(s) (e.g., UE-1) shares, in step 809, the CO and performs at least one of an UL or SL transmission(s) to the gNB or a second set of UE(s) (e.g., UE-2), in step 808, respectively, wherein the UL and SL transmission(s) can be multiplexed if both of them are transmitted, e.g., TDMed, FDMed, IFDMed or CDMed, and at least one UE, in step 811, in the second set of UE(s) (e.g., UE-2) further shares the CO and performs at least one of an UL or SL transmission(s) to the gNB or the first set of UE(s) (e.g., UE-1), in step 810, respectively, wherein the UL and SL transmission(s) can be multiplexed if both of them are transmitted, e.g., TDMed, FDMed, IFDMed, or CDMed. This example is shown in FIG. 8 (e.g., (C) of FIG. 8), wherein the first set of UE(s) and the second set of UE(s) only include one UE for illustration purpose only, and both sets could include multiple UEs in this example.

In one instance, the DL transmission(s) from the gNB to the first set of UE(s) (e.g., UE-1) include at least time domain resource allocation for the SL transmission(s) from the first set of UE(s) (e.g., UE-1) to the second set of UE(s) (e.g., UE-2), and the SL transmission(s) from the first set of UE(s) (e.g., UE-1) to the second set of UE(s) (e.g., UE-2) can be performed on the configured resources from the gNB, wherein the transmission(s) can be performed directly (e.g., in resource allocation mode 1) or additionally conditioned based on the result of SL resource sensing and/or selection (e.g., in resource allocation mode 2).

In another instance, the DL transmission(s) from the gNB to the first set of UE(s) (e.g., UE-1) include at least time domain resource allocation for the SL transmission(s) from the second set of UE(s) (e.g., UE-2) to the first set of UE(s) (e.g., UE-1), and the SL transmission(s) from the second set of UE(s) (e.g., UE-2) to the first set of UE(s) (e.g., UE-1) can be performed on the configured resources from the gNB, wherein the transmission(s) can be performed directly (e.g., in resource allocation mode 1) or additionally conditioned based on the result of SL resource sensing and/or selection (e.g., in resource allocation mode 2).

In yet another example, a gNB, in step 812, initializes the channel occupancy for DL transmission(s) to a first set of UEs (e.g., UE-1), and at least one UE in the first set of UE(s) (e.g., UE-1) shares, in step 813, the CO and performs SL transmission(s) to a second set of UE(s) (e.g., UE-2), and at least one UE in the second set of UE(s) (e.g., UE-2) shares, in step 814, the CO and performs SL transmission(s) to the first set of UE(s) (e.g., UE-1), and at least one UE in the first set of UE(s) (e.g., UE-1) shares the CO and performs UL transmission(s) to the gNB in step 815, wherein the order of the SL and/or UL transmissions may exchange (e.g., the order of 813, 814, and 815 may exchange in FIG. 8 (e.g., (D) of FIG. 8). This example is shown in FIG. 8 (e.g., (D) of FIG. 8), wherein the first set of UE(s) and the second set of UE(s) only include one UE for illustration purpose only, and both sets could include multiple UEs in this example.

In one instance, the DL transmission(s) from the gNB to the first set of UE(s) (e.g., UE-1) include at least time domain resource allocation for the SL transmission(s) from the first set of UE(s) (e.g., UE-1) to the second set of UE(s) (e.g., UE-2), and the SL transmission(s) from the first set of UE(s) (e.g., UE-1) to the second set of UE(s) (e.g., UE-2) can be performed on the configured resources from the gNB, wherein the transmission(s) can be performed directly (e.g., in resource allocation mode 1) or additionally conditioned based on the result of SL resource sensing and/or selection (e.g., in resource allocation mode 2).

In another instance, the DL transmission(s) from the gNB to the first set of UE(s) (e.g., UE-1) include at least time domain resource allocation for the SL transmission(s) from the second set of UE(s) (e.g., UE-2) to the first set of UE(s) (e.g., UE-1), and the SL transmission(s) from the second set of UE(s) (e.g., UE-2) to the first set of UE(s) (e.g., UE-1) can be performed on the configured resources from the gNB, wherein the transmission(s) can be performed directly (e.g., in resource allocation mode 1) or additionally conditioned based on the result of SL resource sensing and/or selection (e.g., in resource allocation mode 2).

In yet another example, a gNB, in step 816, initializes the channel occupancy for DL transmission(s) to a first set of UEs (e.g., UE-1), and at least one UE in the first set of UE(s) (e.g., UE-1) shares, in step 818, the CO and performs at least one of an UL or SL transmission(s) to the gNB or a second set of UE(s) (e.g., UE-2) in step 817, respectively, wherein the UL and SL transmission(s) can be multiplexed if both of them are transmitted, e.g., TDMed, FDMed, IFDMed, or CDMed, and at least one UE in the second set of UE(s) (e.g., UE-2) further shares the CO and performs at least one of an UL or SL transmission(s) to the gNB in step 828 or a third set of UE(s) (e.g., UE-3) in step 819, respectively, wherein the UL and SL transmission(s) can be multiplexed if both of them are transmitted, e.g., TDMed, FDMed, IFDMed, or CDMed. This example is shown in FIG. 8 (e.g., (E) of FIG. 8), wherein the first set of UE(s) and the second set of UE(s) only include one UE for illustration purpose only, and both sets could include multiple UEs in this example.

In one instance, the DL transmission(s) from the gNB to the first set of UE(s) (e.g., UE-1) include at least time domain resource allocation for the SL transmission(s) from the first set of UE(s) (e.g., UE-1) to the second set of UE(s) (e.g., UE-2), and the SL transmission(s) from the first set of UE(s) (e.g., UE-1) to the second set of UE(s) (e.g., UE-2) can be performed on the configured resources from the gNB, wherein the transmission(s) can be performed directly (e.g., in resource allocation mode 1) or additionally conditioned based on the result of SL resource sensing and/or selection (e.g., in resource allocation mode 2).

In another instance, the DL transmission(s) from the gNB to the first set of UE(s) (e.g., UE-1) include at least time domain resource allocation for the SL transmission(s) from the second set of UE(s) (e.g., UE-2) to the third set of UE(s) (e.g., UE-3), and the SL transmission(s) from the second set of UE(s) (e.g., UE-2) to the third set of UE(s) (e.g., UE-3) can be performed on the configured resources from the gNB, wherein the transmission(s) can be performed directly (e.g., in resource allocation mode 1) or additionally conditioned based on the result of SL resource sensing and/or selection (e.g., in resource allocation mode 2).

In one example, the gNB initializing the CO cannot continue to transmit after a UE shares the CO and transmits (e.g., there is at most one switching point from the gNB perspective).

In one sub-example, there is a further condition on the duration of the gap between the gNB's transmission(s) and the proceeding UL and/or SL transmission(s). For one instance, the duration of the gap cannot exceed a pre-defined threshold (e.g., 25 μs).

In another sub-example, there is a further condition on the duration of the gap between UL and/or SL transmission(s). For one instance, the duration of the gap cannot exceed a pre-defined threshold (e.g., 16 μs or 25 μs).

In one example, the gNB initializing the CO can continue to transmit after a UE shares the CO and transmits (e.g., no limitation on the number of switching points from the gNB perspective).

In one sub-example, there is a further condition on the duration of the gap(s) between the transmission bursts. For one instance, the duration of any gap between transmission bursts cannot exceed a pre-defined threshold (e.g., 25 μs).

In another sub-example, there is no condition on the duration of the gap(s) between the transmission bursts. For one instance, the duration of gap(s) is not counted into the channel occupancy time.

In another example, whether the CO initialized by the gNB can continue to transmit after other node shares the CO and transmits can be provided to the UE, e.g., configured by a higher layer parameter or provided in a pre-configuration.

In yet another example, for this embodiment to be supported, there can be a further condition on the priority of SL transmission(s). For one instance, if the priority of intended SL transmission(s) is at least one of the same as or higher than the priority of the current SL transmission(s), the CO can be shared to perform the intended SL transmission(s).

In yet another example, whether the CO initialized by the gNB can be shared with other nodes can be based on a further condition on the number or duration of failures in the channel access procedure. For one instance, if the number of failures in the channel access procedure exceeds a pre-defined threshold, the CO can be shared with other nodes after a successful channel access procedure. For another instance, if the duration of failures in the channel access procedure exceeds a predefined threshold, the CO can be shared with other nodes after a successful channel access procedure.

In one example, for this embodiment to be supported, there is a further condition on the UE(s). For instance, at least one of the first set of UE(s) (e.g., UE-1) or the second set of UE(s) (e.g., UE-2) or the third set of UE(s) (e.g., UE-3) is within the coverage of the gNB.

In one example, for this embodiment to be supported, there is a further condition on the SL transmission(s). For one instance, at least one of the examples on SL transmission burst described in this disclosure needs to be satisfied (e.g., Example SL-Burst-1 to SL-Burst-6), given the particular UE(s) as the receiver(s) of the corresponding SL transmission(s) in the examples.

For one instance, the SL transmission(s), e.g., the SL transmission(s) from the first set of UE(s) (e.g., UE-1) to the second set of UE(s) (e.g., UE-2), and/or the SL transmission(s) from the second set of UE(s) (e.g., UE-2) to the third set of UE(s) (e.g., UE-3) if applicable, may not include unicast information or groupcast information to UE(s) other than the set of UE(s) as the receiver(s) of the DL transmission.

In another example, if the gNB initializing the CO can continue to transmit after a UE shares the CO and transmits (e.g., no limitation on the number of switching points from the gNB perspective), for this embodiment to be supported, there is a further condition on the DL transmission(s). For one instance, the DL transmission may include non-unicast information and/or unicast information only to the UE(s) involved in the SL transmission(s) in the CO.

In yet another example, for this embodiment to be supported, there is a further condition on the UL transmission(s). For one instance, the UL transmission may only include the gNB as the receiver.

In one example, if the gNB initializing the CO can continue to transmit after a UE shares the CO and transmits (e.g., no limitation on the number of switching points from the gNB perspective), for the gap(s) between gNB's transmission(s) and the previous SL and/or UL transmission(s), depending on the duration of the gap, the gNB may perform transmission on the DL after performing channel access procedure given by at least one of the examples described in this disclosure (e.g., Example DL-LBT-1 to DL-LBT-3).

In another example, for the gap(s) before SL transmission(s), depending on the duration of the gap, the UE may perform transmission on the SL after performing channel access procedure given by at least one of the examples described in this disclosure (e.g., Example SL-LBT-1 to SL-LBT-6).

In yet another example, for the gap(s) before UL transmission(s), depending on the duration of the gap, the UE may perform transmission on the UL after performing channel access procedure given by at least one of the examples described in this disclosure (e.g., Example UL-LBT-1 to UL-LBT-3).

In yet another example, for the gap(s) before multiplexed UL/SL transmission(s), depending on the duration of the gap, the UE may perform transmission on the UL/SL after performing channel access procedure given by at least one of the examples described in this disclosure (e.g., Example UL-SL-LBT-1 to UL-SL-LBT-6).

In yet another example, if an indication on the SL energy detection threshold is not provided (e.g., by a higher layer parameter and/or by a pre-configuration), at least one of the SL transmission(s) cannot include unicast transmission(s). For one instance, there is a further constraint on the duration of the SL transmission(s), e.g., no more than 2, 4, or 8 symbols for the SCS of SL BWP as 15, 30, or 60 kHz, respectively.

In yet another example, if an indication on the DL energy detection threshold is not provided (e.g., by a higher layer parameter and/or by a pre-configuration), the DL transmission(s) cannot include unicast transmission(s). For one instance, there is a further constraint on the duration of the DL transmission(s), e.g., no more than 2, 4, or 8 symbols for the SCS of SL BWP as 15, 30, or 60 kHz, respectively.

In one embodiment, a gNB can initialize a channel occupancy for DL transmission(s) and share the CO with at least one UE for SL and/or transmission(s) and/or with at least one other gNB for DL and/or UL transmission(s).

In one example, the gNB performs a Type 1 DL channel access procedure to initialize the channel occupancy for DL transmission(s).

Figure 9:
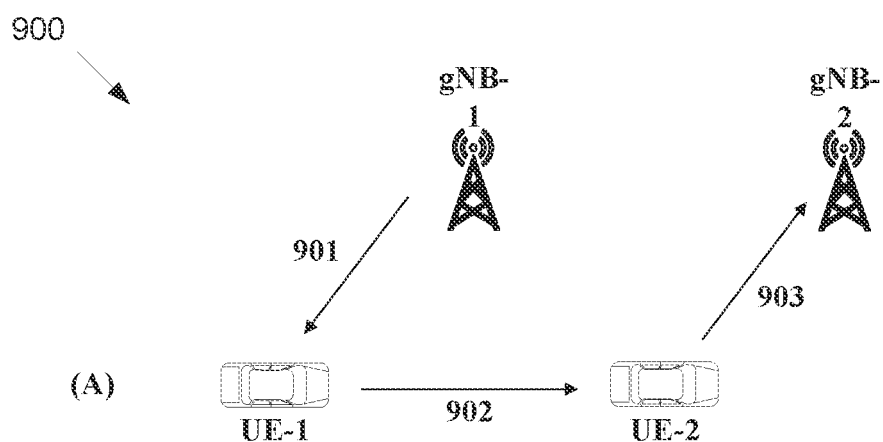
FIG. 9 illustrates an example of CO sharing with another gNB according to various embodiments of the present disclosure.

FIG. 9 illustrates an example of CO sharing with another gNB 900 according to various embodiments of the present disclosure. An embodiment of the CO sharing with another gNB 900 shown in FIG. 9 is for illustration only.

In one example, a first gNB (e.g., gNB-1), in step 901, initializes a channel occupancy transmission(s) to a first set of UEs (e.g., UE-1), and at least one UE in the first set of UE(s) (e.g., UE-1) shares, in step 902, the CO and performs SL transmission(s) to a second set of UE(s) (e.g., UE-2), and at least one UE in the second set of UE(s) (e.g., UE-2) further shares the CO and performs UL transmission(s) to a second gNB (e.g., gNB-2). This example is shown in FIG. 9 (e.g., (A) of FIG. 9).

In one example, there is a further condition on the duration of the gap(s) between the transmission bursts. For one instance, the duration of any gap between transmission bursts cannot exceed a pre-defined threshold (e.g., 25 μs).

In another example, whether the CO initialized by the gNB can continue to transmit after other node shares the CO and transmits can be provided to the UE, e.g., configured by a higher layer parameter and/or provided by a pre-configuration.

In yet another example, whether the CO initialized by the gNB can be shared with other nodes can be based on a further condition on the number or duration of failures in the channel access procedure. For one instance, if the number of failures in the channel access procedure exceeds a pre-defined threshold, the CO can be shared with other nodes after a successful channel access procedure. For another instance, if the duration of failures in the channel access procedure exceeds a predefined threshold, the CO can be shared with other nodes after a successful channel access procedure.

In one example, for this embodiment to be supported, there is a further condition on the UE(s). For instance, at least one of the first set of UE(s) (e.g., UE-1) or the second set of UE(s) (e.g., UE-2) is within the coverage of the gNB-1 and/or gNB-2.

In one example, for this embodiment to be supported, there is a further condition on the SL transmission(s). For one instance, at least one of the examples on SL transmission burst described in this disclosure needs to be satisfied (e.g., Example SL-Burst-1 to SL-Burst-6), given the particular UE(s) as the receiver(s) of the corresponding SL transmission(s) in the examples.

In one example, for the gap(s) before SL transmission(s), depending on the duration of the gap, the UE may perform transmission on the SL after performing channel access procedure given by at least one of the examples described in this disclosure (e.g., Example SL-LBT-1 to SL-LBT-6).

In another example, for the gap(s) before UL transmission(s), depending on the duration of the gap, the UE may perform transmission on the UL after performing channel access procedure given by at least one of the examples described in this disclosure (e.g., Example UL-LBT-1 to UL-LBT-3).

In yet another example, if an indication on the SL energy detection threshold is not provided (e.g., by a higher layer parameter and/or by a pre-configuration), at least one of the SL transmission(s) cannot include unicast transmission(s). For one instance, there is a further constraint on the duration of the SL transmission(s), e.g., no more than 2, 4, or 8 symbols for the SCS of SL BWP as 15, 30, or 60 kHz, respectively.

In one embodiment, examples in this disclosure can be combined. For example, a gNB can initialize a channel occupancy for DL transmission(s) and share the CO with at least one UE for SL and/or UL transmission(s) or with another gNB for DL transmission(s). The condition(s) associated with the embodiment(s) and the example(s) of the embodiment(s) in this disclosure can also be applicable when the examples are combined.

In one embodiment, a node (e.g., either a gNB or a UE) with an intended transmission can be included (e.g., shared or initialized) in more than one channel occupancies initialized from multiple nodes.

Figure 10:
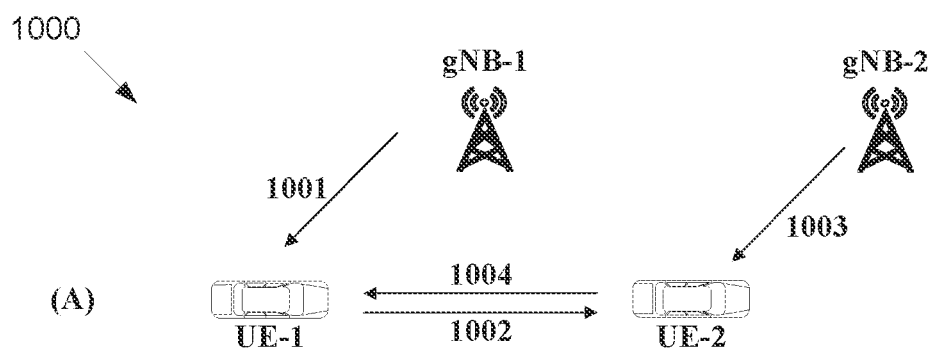
FIG. 10 illustrates an example of CO sharing more than one CO according to various embodiments of the present disclosure.
Figure 10:
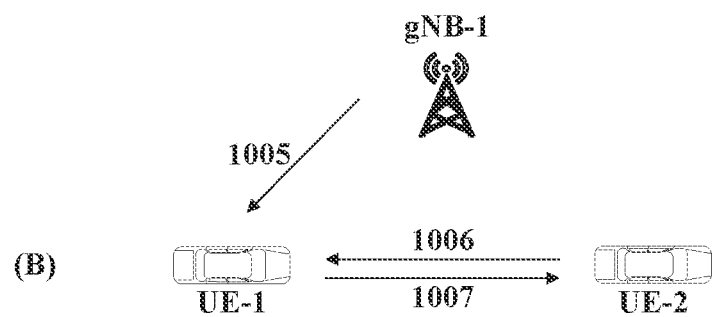
Figure 10:
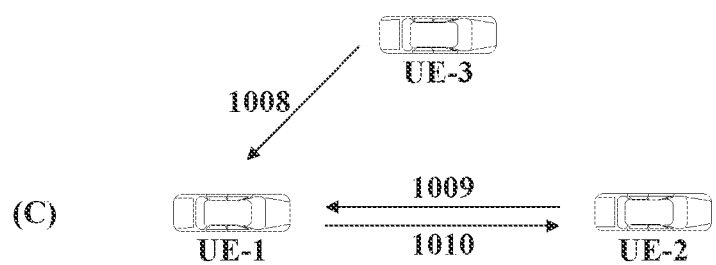

FIG. 10 illustrates an example of CO sharing more than one CO 1000 according to various embodiments of the present disclosure. An embodiment of the CO sharing more than one CO 1000 shown in FIG. 10 is for illustration only.

For one example, a node with an intended transmission can be included in channel occupancies initialized by at least two different gNBs. For one instance, one node (e.g., UE-1) with intended SL transmission 1002 can be included in a first CO initialized by the gNB-1 (e.g., shared CO after DL transmission 1001) and a second CO initialized by the gNB-2 (e.g., shared CO after DL transmission 1003 and SL transmission 1004), as shown in FIG. 10 (e.g., (A) of FIG. 10).

For another example, a node can be included in channel occupancies initialized by at least two different UEs. For one instance, one node (e.g., UE-1) with intended SL transmission 807 can be included in a first CO initialized by the gNB-1 (e.g., shared CO after DL transmission 805) and a second CO initialized by UE-2 (e.g., shared CO after SL transmission 806), as shown in FIG. 10 (e.g., (B) of FIG. 10).

For yet another example, a node can be included in channel occupancies initialized by at least one gNB and at least one UE. For one instance, one node (e.g., UE-1) with intended SL transmission 1010 can be included in a first CO initialized by the UE-2 (e.g., shared CO after SL transmission 1009) and a second CO initialized by the UE-3 (e.g., shared CO after SL transmission 1008), as shown in FIG. 10 (e.g., (C) of FIG. 10).

For one example, the node could be included in the channel occupancy initialized by itself.

For one example, if the intended transmission from the node (e.g., UE-1) is allowed in all the more than one channel occupancies initialized from multiple nodes (e.g., K nodes), wherein the remaining channel occupancy time from the multiple nodes are denoted as $T_1, \ldots, T_K$, then the node may transmit the intended transmission (e.g., potentially after a channel access procedure) for a time duration of at most $T=\max\{T_1, \ldots, T_K\}$. In this example, the effective remaining channel occupancy time is $T=\max\{T_1, \ldots, T_K\}$.

For another example, if the intended transmission from the node (e.g., UE-1) is allowed in all the more than one channel occupancies initialized from multiple nodes (e.g., K nodes), wherein the remaining channel occupancy time from the multiple nodes are denoted as $T_1, \ldots, T_K$, then the node may transmit the intended transmission (e.g., potentially after a channel access procedure) for a time duration of at most $T=\min\{T_1, \ldots, T_K\}$. In this example, the effective remaining channel occupancy time is $T=\min\{T_1, \ldots, T_K\}$.

Figure 11:
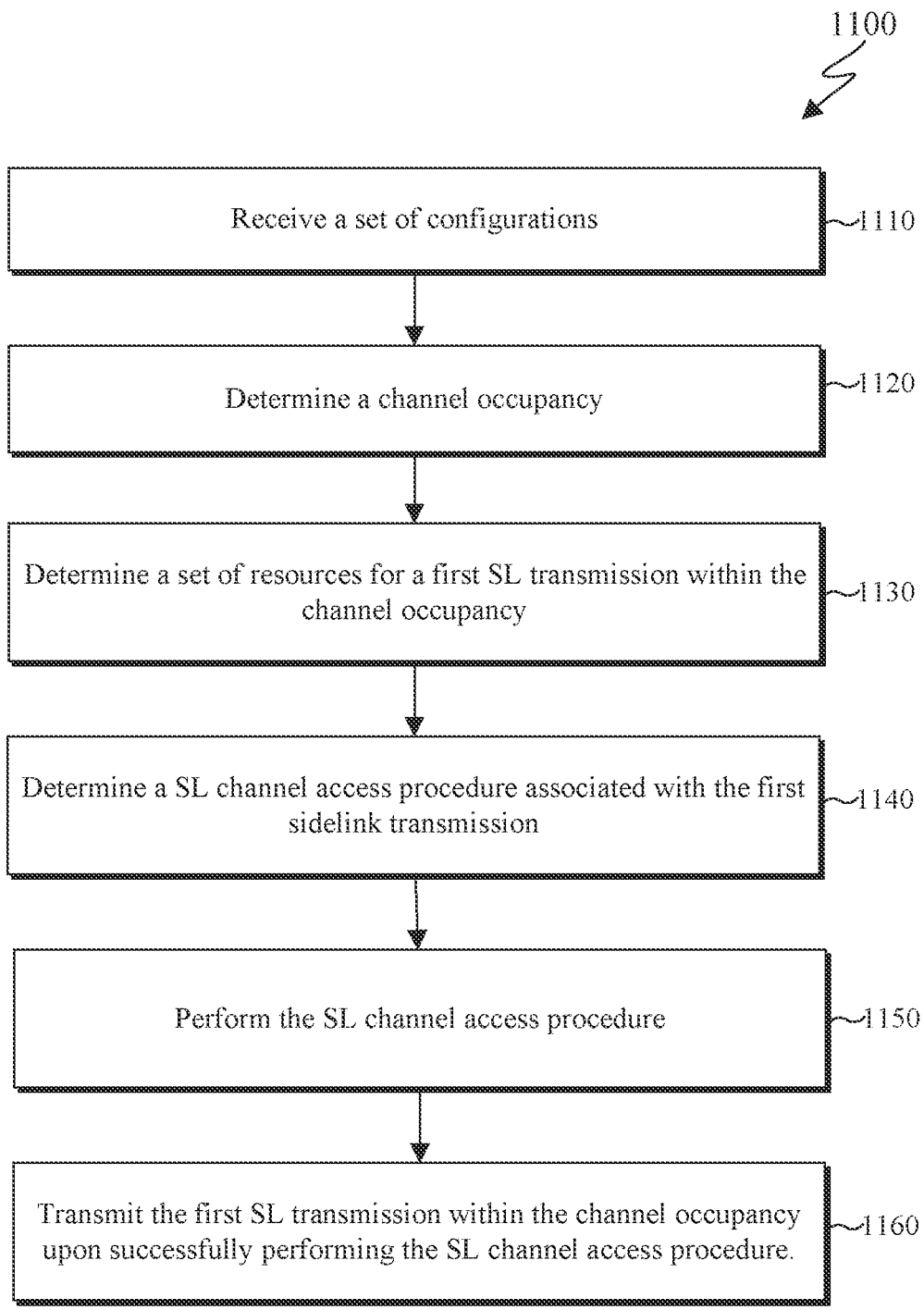
FIG. 11 illustrates an example flowchart of a method for CO sharing with SL according to various embodiments of the present disclosure.

FIG. 11 illustrates an example flowchart of a method 1100 for CO sharing with SL according to various embodiments of the present disclosure. The steps of the method 1100 of FIG. 11 can be performed by any of the UEs 111-116 of FIG. 1, such as the UE 116 of FIG. 3 and a corresponding procedure may be performed by a BS such as gNB 102. The method 1100 is for illustration only and other embodiments can be used without departing from the scope of the present disclosure.

The method 1100 begins with the UE receiving a set of configurations (step 1110). For example, in step 1110, the UE may receive the set of configurations from the BS. The UE then determines a channel occupancy (step 1120). For example, in step 1120, the UE may determine the channel occupancy initiated by the BS based on the set of configurations.

The UE then determines a set of resources for a first SL transmission within the channel occupancy based on the set of configurations (step 1130). For example, in step 1130, the first SL transmission is a PSSCH or a PSCCH conveying a unicast transmission to the at least one other UE; or a PSSCH or a PSCCH conveying a groupcast transmission to the at least one other UE.

The UE then determines a SL channel access procedure associated with the first SL transmission based on the set of configurations (step 1140). For example, in step 1140, the UE may determine a gap in time domain between a transmission prior to the first SL transmission and the first SL transmission and determine the SL channel access procedure based on a duration of the gap. For example, the SL channel access procedure is Type 2A, when the duration of the gap is at least 25 μs; the SL channel access procedure is Type 2B, when the duration of the gap is 16 μs; and the SL channel access procedure is Type 2C, when the duration of the gap is less than 16 μs.

The UE then performs the SL channel access procedure (step 1150). The UE then transmits, to at least one other UE, the first SL transmission within the channel occupancy upon successfully performing the SL channel access procedure (step 1160). For example, in step 1160, when the SL channel access procedure is Type 2A, the first SL transmission starts after sensing a channel to be idle for at least a sensing interval of 25 μs; when the SL channel access procedure is Type 2B, the first SL transmission starts after sensing the channel to be idle for at least a sensing interval of 16 μs; and when the SL channel access procedure is Type 2C, the first SL transmission starts without sensing the channel.

In various embodiments, the UE may also receive a second SL transmission within the channel occupancy after transmitting the first SL transmission. For example, the second SL transmission may be a PSSCH or a PSCCH conveying a unicast transmission, or a PSFCH. In various embodiments, the UE may determine a gap in time domain between a transmission prior to the second SL transmission and the second SL transmission and determine a second SL channel access procedure based on a duration of the gap. For example, the second SL channel access procedure is Type 2A, when the duration of the gap is at least 25 μs; the second SL channel access procedure is Type 2B, when the duration of the gap is 16 μs; and the second SL channel access procedure is Type 2C, when the duration of the gap is less than 16 μs. In various embodiments, the UE may also indicate the second SL channel access procedure to the at least one other UE.

The above flowcharts and signaling flow diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver configured to receive, from a base station (BS), a set of information; and
   a processor operably coupled to the transceiver, the processer configured to:
      determine a channel occupancy initiated by the BS based on the set of information;
      determine a set of resources for a first sidelink transmission within the channel occupancy based on the set of information;
      determine a sidelink channel access procedure associated with the first sidelink transmission based on the set of information; and
      perform the sidelink channel access procedure,
      wherein the transceiver is further configured to transmit, to at least one other UE, the first sidelink transmission within the channel occupancy upon successfully performing the sidelink channel access procedure.

2. The UE of claim 1, wherein the first sidelink transmission is:
   a physical sidelink shared channel (PSSCH) or a physical sidelink control channel (PSCCH) conveying a unicast transmission to the at least one other UE; or
   a PSSCH or a PSCCH conveying a groupcast transmission to the at least one other UE.

3. The UE of claim 1, wherein:
   the processor is further configured to determine:
      a gap in time domain between a transmission prior to the first sidelink transmission and the first sidelink transmission, and
      based on a duration of the gap, the sidelink channel access procedure;
   wherein:
      the sidelink channel access procedure is Type 2A, when the duration of the gap is at least 25 μs;
      the sidelink channel access procedure is Type 2B, when the duration of the gap is 16 μs; and
      the sidelink channel access procedure is Type 2C, when the duration of the gap is less than 16 μs.

4. The UE of claim 3, wherein:
   when the sidelink channel access procedure is Type 2A, the first sidelink transmission starts after sensing a channel to be idle for at least a sensing interval of 25 μs;
   when the sidelink channel access procedure is Type 2B, the first sidelink transmission starts after sensing the channel to be idle for at least a sensing interval of 16 μs; and
   when the sidelink channel access procedure is Type 2C, the first sidelink transmission starts without sensing the channel.

5. The UE of claim 1, wherein the transceiver is further configured to receive a second sidelink transmission within the channel occupancy after transmitting the first sidelink transmission.

6. The UE of claim 5, wherein the second sidelink transmission is:
   a physical sidelink shared channel (PSSCH) or a physical sidelink control channel (PSCCH) conveying a unicast transmission; or
   a physical sidelink feedback channel (PSFCH).

7. The UE of claim 5, wherein:
   the processor is further configured to determine:
      a gap in time domain between a transmission prior to the second sidelink transmission and the second sidelink transmission, and
      based on a duration of the gap, a second sidelink channel access procedure;
   wherein:
      the second sidelink channel access procedure is Type 2A, when the duration of the gap is at least 25 μs;
      the second sidelink channel access procedure is Type 2B, when the duration of the gap is 16 μs;
      the second sidelink channel access procedure is Type 2C, when the duration of the gap is less than 16 μs; and
      the transceiver is further configured to indicate the second sidelink channel access procedure to the at least one other UE.

8. A method of a user equipment (UE) in a wireless communication system, the method comprising:
   receiving, from a base station (BS), a set of information;
   determining a channel occupancy initiated by the BS based on the set of information;
   determining a set of resources for a first sidelink transmission within the channel occupancy based on the set of information;
   determining a sidelink channel access procedure associated with the first sidelink transmission based on the set of information;
   performing the sidelink channel access procedure; and
   transmitting, to at least one other UE, the first sidelink transmission within the channel occupancy upon successfully performing the sidelink channel access procedure.

9. The method of claim 8, wherein the first sidelink transmission is:
   a physical sidelink shared channel (PSSCH) or a physical sidelink control channel (PSCCH) conveying a unicast transmission to the at least one other UE; or
   a PSSCH or a PSCCH conveying a groupcast transmission to the at least one other UE.

10. The method of claim 8 further comprising:
   determining a gap in time domain between a transmission prior to the first sidelink transmission and the first sidelink transmission, wherein determining the sidelink channel access procedure comprises determining the sidelink channel access procedure based on a duration of the gap, and
wherein:
the sidelink channel access procedure is Type 2A, when the duration of the gap is at least 25 μs;
the sidelink channel access procedure is Type 2B, when the duration of the gap is 16 μs; and
the sidelink channel access procedure is Type 2C, when the duration of the gap is less than 16 μs.

11. The method of claim 10, wherein:
when the sidelink channel access procedure is Type 2A, the first sidelink transmission starts after sensing a channel to be idle for at least a sensing interval of 25 μs;
when the sidelink channel access procedure is Type 2B, the first sidelink transmission starts after sensing the channel to be idle for at least a sensing interval of 16 μs; and
when the sidelink channel access procedure is Type 2C, the first sidelink transmission starts without sensing the channel.

12. The method of claim 8, further comprising receiving a second sidelink transmission within the channel occupancy after transmitting the first sidelink transmission.

13. The method of claim 12, wherein the second sidelink transmission is:
a physical sidelink shared channel (PSSCH) or a physical sidelink control channel (PSCCH) conveying a unicast transmission; or
a physical sidelink feedback channel (PSFCH).

14. The method of claim 12, further comprising:
determining a gap in time domain between a transmission prior to the second sidelink transmission and the second sidelink transmission; and
determining a second sidelink channel access procedure based on a duration of the gap,
wherein:
the second sidelink channel access procedure is Type 2A, when the duration of the gap is at least 25 μs;
the second sidelink channel access procedure is Type 2B, when the duration of the gap is 16 μs; and
the second sidelink channel access procedure is Type 2C, when the duration of the gap is less than 16 μs; and
indicating the second sidelink channel access procedure to the at least one other UE.

15. A base station (BS) in a wireless communication system, the BS comprising:
a processor configured to:
perform a channel access procedure to initiate a channel occupancy;
determine a set of resources for a first sidelink transmission within the channel occupancy;
determine a sidelink channel access procedure associated with the first sidelink transmission; and
determine a set of information to include information on the channel occupancy, the set of resources for the first sidelink transmission, or the sidelink channel access procedure associated with the first sidelink transmission; and
a transceiver operably coupled to the processer, the transceiver configured to transmit the set of information, to a user equipment (UE), over a downlink channel.

16. The BS of claim 15, wherein the first sidelink transmission is:
a physical sidelink shared channel (PSSCH) or a physical sidelink control channel (PSCCH) conveying a unicast transmission to at least one other UE; or
a PSSCH or a PSCCH conveying a groupcast transmission to the at least one other UE.

17. The BS of claim 15, wherein the processor is further configured to:
determine a gap in time domain between a transmission prior to the first sidelink transmission and the first sidelink transmission; and
determine the sidelink channel access procedure based on a duration of the gap,
wherein:
the sidelink channel access procedure is Type 2A, when the duration of the gap is at least 25 μs;
the sidelink channel access procedure is Type 2B, when the duration of the gap is 16 μs; and
the sidelink channel access procedure is Type 2C, when the duration of the gap is less than 16 μs.

18. The BS of claim 17, wherein:
when the sidelink channel access procedure is Type 2A, the first sidelink transmission starts after sensing a channel to be idle for at least a sensing interval of 25 μs;
when the sidelink channel access procedure is Type 2B, the first sidelink transmission starts after sensing the channel to be idle for at least a sensing interval of 16 μs; and
when the sidelink channel access procedure is Type 2C, the first sidelink transmission starts without sensing the channel.

19. The BS of claim 15, wherein:
the processor is further configured to determine a set of resources for a second sidelink transmission within the channel occupancy, and
the second sidelink transmission is:
a physical sidelink shared channel (PSSCH) or a physical sidelink control channel (PSCCH) conveying a unicast transmission; or
a physical sidelink feedback channel (PSFCH).

20. The BS of claim 19, wherein the processor is further configured to:
determine a gap in time domain between a transmission prior to the second sidelink transmission and the second sidelink transmission within the channel occupancy;
determine a second sidelink channel access procedure associated with the second sidelink transmission based on a duration of the gap, wherein:
the second sidelink channel access procedure is Type 2A, when the duration of the gap is at least 25 μs;
the second sidelink channel access procedure is Type 2B, when the duration of the gap is 16 μs; and
the second sidelink channel access procedure is Type 2C, when the duration of the gap is less than 16 μs; and
indicate the second sidelink channel access procedure associated with the second sidelink transmission in the set of information.

* * * * *